US012742067B2

(12) United States Patent
Pendalwar et al.

(10) Patent No.: US 12,742,067 B2
(45) Date of Patent: Sep. 22, 2026

(54) PHENOLIC RESIN COMPOSITIONS AS BINDERS IN REFRACTORY ARTICLES

(71) Applicants: Arclin USA LLC, Alpharetta, GA (US); HARBISONWALKER INTERNATIONAL HOLDINGS, INC., Moon Township, PA (US)

(72) Inventors: Shekhar L. Pendalwar, Lawrenceville, GA (US); James T. Wright, Roswell, GA (US); Lisa M. Arthur, Roswell, GA (US); Darren A. Riedlinger, Roswell, GA (US); Yusuf Celikbag, Roswell, GA (US); Tomasz Ventz, Bethel Park, PA (US)

(73) Assignees: Arclin USA LLC, Alpharetta, GA (US); Harbisonwalker International Holdings, Inc., Moon Township, PA (US)

( * ) Notice: Subject to any disclaimer, the term of this patent is extended or adjusted under 35 U.S.C. 154(b) by 218 days.

(21) Appl. No.: 17/705,786

(22) Filed: Mar. 28, 2022

(65) Prior Publication Data

US 2023/0303821 A1 Sep. 28, 2023

(51) Int. Cl.
*C08L 61/06* (2006.01)
*B22D 41/02* (2006.01)

(52) U.S. Cl.
CPC .............. *C08L 61/06* (2013.01); *B22D 41/02* (2013.01)

(58) Field of Classification Search
CPC ................................ C08L 61/06; B22D 41/02
See application file for complete search history.

(56) References Cited

U.S. PATENT DOCUMENTS 3,020,254 A 2/1962 Less et al.
3,334,460 A 8/1967 McShane
4,058,403 A * 11/1977 Funabiki ............... C04B 35/013 501/99
4,210,453 A 7/1980 Bowers
4,252,700 A 2/1981 Funabiki et al.
4,362,203 A 12/1982 Konii et al.
4,433,120 A 2/1984 Chiu
4,454,239 A 6/1984 Cassens, Jr.
4,468,359 A 8/1984 Lemon et al.
4,668,759 A 5/1987 Iyer et al.
4,683,252 A * 7/1987 Dunnavant .......... C08G 18/542 524/121
4,740,535 A 4/1988 Iyer et al.
4,929,648 A 5/1990 Armbruster et al.
4,977,209 A 12/1990 Barker et al.
4,980,394 A 12/1990 Lemon et al.
4,983,218 A 1/1991 Mascioli
5,011,886 A 4/1991 Buschfeld et al.
5,043,412 A 8/1991 Chandramouli et al.
5,096,983 A 3/1992 Gerber
5,145,887 A 9/1992 Taylor et al.
5,169,880 A 12/1992 Yoshida et al.
5,182,347 A 1/1993 Gerber
5,202,403 A 4/1993 Doering
5,214,079 A 5/1993 Gerber
5,242,957 A 9/1993 Smith et al.
5,248,707 A 9/1993 Gerber
5,262,495 A 11/1993 Gerber
5,281,644 A 1/1994 Iyer et al.
5,294,648 A 3/1994 Smith et al.
5,302,027 A 4/1994 Park
5,304,225 A * 4/1994 Gardziella ............ C04B 35/524 524/541
5,340,888 A 8/1994 Lemon et al.
5,342,880 A 8/1994 Chappelie
5,403,791 A 4/1995 Minami
5,470,924 A 11/1995 Ryan
(Continued)

FOREIGN PATENT DOCUMENTS

CA 981909 A 1/1976
CN 104844238 A * 8/2015
(Continued)

OTHER PUBLICATIONS

Passera et al. (Metallurgical and Materials Transactions B vol. 52B, 2021, p. 1681-1694) (Year: 2021).*
Machine Translation of CN 104844238, 2024 (Year: 2024).*
King et al. (Journal of Applied Polymer Science, vol. 18, p. 1117-1130, 1974) (Year: 1974).*
Benk et al. (Fuel Processing Technology, 8-9, 2008, 38-46) (Year: 2008).*
Wong, Hsi-Wu, et al. "Measurement of pyrolysis products from phenolic polymer thermal decomposition." 52nd Aerospace Sciences Meeting. National Harbor, Maryland (2014): 1-14.
Ashland. "Formulating elegant liquid and semisolid drug products—natrosol™ 250 hydroxyethylcellulose (HEC)." Retrieved from Internet: <URL: https://www.ashland.com/file_source/Ashland/links/PHA18-101_Natrosol_250_HEC_Formulating_elegant_liquid_and_semisolid_%20drug_products.pdf>, accessed Sep. 20, 2020. (2018): 1-32.
(Continued)

*Primary Examiner* — Liam J Heincer
(74) *Attorney, Agent, or Firm* — Ram W. Sabnis

(57) ABSTRACT

A liquid phenolic resin composition for use as a binder for a refractory article, the phenolic resin composition comprising a phenol formaldehyde resin, wherein the phenolic resin composition has a reduced vaporization percentage of phenolic compounds. The phenolic resin composition is used in refractory compositions comprising at least 50 wt. % of one or more refractory aggregate(s), based on a total weight of the refractory composition. There is also disclosed a refractory article, such as a brick, formed into a shape comprising said refractory composition and heating until the phenolic resin composition is at least 20% cured and having a green strength after curing at 170° C. for 5 hours sufficient for handling the solid without falling apart. Ladles for transporting and pouring molten metals can be made with an inner liner formed by stacking at least two bricks along the bottom and sides of a ladle shaped metal outer liner, and then heating the stacked bricks to a temperature sufficient to carbonize the resin thereby forming the inner liner of the ladle.

12 Claims, No Drawings

(56) References Cited

U.S. PATENT DOCUMENTS 5,681,916 A 10/1997 Buschfeld et al.
5,686,506 A * 11/1997 Gerber .................... C04B 35/03 528/145
5,705,537 A 1/1998 Hartman, Jr. et al.
5,763,559 A 6/1998 Black
6,214,964 B1 4/2001 Ryan
6,361,866 B1 3/2002 Ogima et al.
6,378,599 B1 4/2002 Schmidt et al.
6,620,901 B2 9/2003 Chen
6,628,552 B1 9/2003 Larsen et al.
6,632,912 B2 10/2003 Sudan
6,645,425 B1 11/2003 Wienand et al.
6,673,306 B2 1/2004 Abrino et al.
6,750,282 B1 6/2004 Schall et al.
6,787,098 B2 9/2004 Abrino et al.
6,846,766 B1 1/2005 Bartha et al.
7,049,387 B2 5/2006 Dupre, Jr.
7,214,332 B2 5/2007 Bemis et al.
7,244,501 B2 7/2007 Raghavendran et al.
7,635,728 B2 12/2009 Diakoumakos et al.
7,682,697 B2 3/2010 Raghavendran et al.
7,935,778 B2 5/2011 Schuren et al.
8,148,463 B2 4/2012 Lenzen et al.
8,372,899 B2 2/2013 Kotzev et al.
RE44,893 E 5/2014 Raghavendran et al.
8,796,375 B2 8/2014 Osada
8,912,243 B2 12/2014 Glew
8,975,320 B2 3/2015 Paul
9,775,239 B2 9/2017 Arisawa et al.
10,427,212 B2 10/2019 Trikha
2002/0022567 A1* 2/2002 Li ........................... C04B 35/66 501/101
2003/0096922 A1* 5/2003 Tutin ....................... C08G 8/28 525/480
2006/0094853 A1 5/2006 Arbuckle
2006/0100412 A1 5/2006 Schmidt et al.
2008/0280787 A1 11/2008 Rediger et al.
2010/0004370 A1 1/2010 Paul
2011/0086988 A1 4/2011 Van Benthem et al.
2017/0174814 A1 6/2017 Trikha
2017/0349835 A1 12/2017 Köstler et al.
2019/0168289 A1 6/2019 Trikha
2019/0224744 A1 7/2019 Trikha
2023/0303821 A1* 9/2023 Pendalwar ............. B22D 41/02

FOREIGN PATENT DOCUMENTS

CN 111303361 A 6/2020
EP 0669293 A1 8/1995
GB 2131789 A 6/1984
IN 284055 B 8/2010
JP S58-19351 A 2/1983
JP 5541761 B2 7/2014

OTHER PUBLICATIONS

Dow Chemical Company, “Dowsil™ Z-6040 Silane.” Technical Data Sheet, Retrieved from Internet: <URL: https://www.dow.com/content/dam/dcc/documents/en-us/productdatasheet/26/26-27/26-2707-01-dowsil-z-6040-silane.pdf> (2020): 1-4.

J.M. Huber Corporation, “Kemgard® 911C.” Technical Data Sheet. (2015): 1 page.

Lignin, www.storaenso.com, 2018 [retrieved on Oct. 20, 2021] Retrieved from the Internet: <URL: https://www.storaenso.com/en/products/lignin> (7 pages).

International Search Report and Written Opinion for corresponding International application No. PCT/US2023/064270; dated Oct. 12, 2023 (12 pages).

Extended European Search Report and Opinion in European Application No. 23781959.4; dated Aug. 12, 2025 (9 Pages).

* cited by examiner

PHENOLIC RESIN COMPOSITIONS AS BINDERS IN REFRACTORY ARTICLES

TECHNICAL FIELD

The present disclosure relates generally to phenolic resin compositions for use as binders in making refractory articles, such as an inner liner for ladles that transport and pour molten steel in foundries. The inner liner of the ladle is formed by exposing the phenolic resin composition to a high temperature carbonization. The inventive phenolic resin compositions have the advantage of reduced noxious vapor components that volatilize during the high temperature carbonization step. Also, the present disclosure includes a method of forming the phenolic resin compositions, and a method of forming the inner liner of the ladles using the phenolic resin compositions.

BACKGROUND

Ladles are used to hold, transport, and pour molten steel in foundries. These ladles have an outer lining of steel, and an inner lining formed from bricks. The bricks are formed from a phenolic resin (refractory binder) and inorganics. There is a three stage process for forming the bricks. First a mixture of the phenolic resin and inorganics is formed into bricks (requiring sufficient green strength to maintain shape), and second the bricks are heated to a high B stage. Third, the bricks are stacked against the inner surface of the outer shell and then the bricks are heated at 1000-1200° C. in place to fully cure and then carbonize the resin thereby making a working ladle having an inner liner that can withstand the heat of molten metal.

There is a problem with current refractory brick phenolic resins in that an unwanted amount of chemicals will vaporize during the heating steps thereby causing an odor. These malodorous chemicals that vaporize include aromatics.

JP5541761B2 teaches a method of forming refractory brick phenolic resins. The phenolic resin is exposed to high temperatures with superheated steam. The unwanted odor is reduced in this method since the volatile compounds are absorbed by the steam as it cools and condenses. However, this method is problematic in view of the high cost of heating water to superheated steam, and the cost of maintaining the apparatus which is necessary to heat and transfer the water.

Another solution to the vaporized malodorous chemicals is to use reducing conditions during high temperature firing of resin bonded bricks. However, this method makes bricks that are weak and brittle. Also, the process is very expensive and the final product does not perform better than standard resin bonded linings.

Alternative binder systems are based on silicon resins, such as the Sikes® products manufactured by WACKER or the SILIKOPHEN® products manufactured by EVONIK. These products are formed through condensation curing of methyl silicone resin in toluene/xylene. The product can be used as a binder or as an impregnation agent for porous materials. However, bricks made with this binder have poor performance when contacted with steel slags, due to fact that silica is the flux for the slag and slag line brick made with binder containing silicon does not last. Although there is a greatly reduced amount of vaporized chemicals, these alternative binder systems are undesirable in slag lines.

Thus, there remains the need for binder technology having reduced malodorous chemicals that vaporize at high temperatures while still being cost effective and able to meet performance requirements.

SUMMARY OF THE INVENTION

The phenolic resin composition of the present invention solves the problems of current refractory binders by reducing the vaporization of an unwanted amount of noxious chemicals such as phenolic compounds during the heating steps while still being cost effective and able to meet performance requirements.

In one aspect the present invention is drawn to:

1. A liquid phenolic resin composition for use as a binder for a refractory article, the phenolic resin composition comprising a phenol formaldehyde resin, wherein the phenolic resin composition has a vaporization percentage of phenol of less than 4.1% as measured by the following steps:
   (a) curing 5 grams of liquid resin at 170° C. for 5 hours to form a solid;
   (b) cooling the solid to room temperature and then weighing 1 gram of the solid;
   (c) heating the 1 gram of solid in a tube furnace from room temperature to 1000° C. at 15° C./minute, and then being held at 1000° C. under an inert atmosphere for 10 minutes to form a vaporized composition;
   (d) collecting the vaporized composition that vaporizes off from the solid in step (c);
   (e) quantifying the amount of phenol that vaporized from the solid in step (c); and
   (f) determining the amount of the vaporized phenol as a percentage of the 1 gram of cooled solid in step (b).
2. The phenolic resin composition according to the previous embodiment, wherein the phenolic resin composition meets one or more of the following properties:
   a) viscosity may be from 50-10,000 cPs, or 4500-6500 cPs, as measured with a Brookfield RVF viscometer using a No. 1 spindle at 20 rpm, at 25° C.;
   b) pH may be from 7 to less than 11;
   c) nonvolatile content may be from 65-85 wt. % or 76-79 wt. %; and
   d) free formaldehyde may be of less than about 0.3 wt. %, or less than 0.1 wt. % or less than 0.05 wt. %.
3. The phenolic resin composition according to any one of the previous embodiments, wherein the vaporization percentage of the phenol may be less than Reference Sample R-1.
4. The phenolic resin composition according to any one of the previous embodiments, wherein the phenolic resin composition may have a reduced noxious odor when compared to R-1 as measured during a step of heating the phenolic resin composition to at least 1000° C.
5. The phenolic resin composition according to any one of the previous embodiments, wherein the phenolic resin composition may further comprise one or more vapor suppressant(s).
6. The phenolic resin composition according to any one of the previous embodiments, wherein the number average molecular weight (Mn) of the phenol formaldehyde resin may be less than 3000 g/mol, or less than 2000 g/mol, or less than 1000 g/mol, as measured by gel permeation chromatography (GPC).
7. The phenolic resin composition according to any one of the previous embodiments, wherein the weight average molecular weight (Mw) of the phenol formaldehyde resin may be less than 5000 g/mol, or less than 3000 g/mol, or less than 2000 g/mol as measured by GPC.

8. The phenolic resin composition according to any one of the previous embodiments, wherein the phenol formaldehyde resin may have a polydispersity (Mw/Mn) is less than 10, or less than 5, or less than 3.
9. The phenolic resin composition according to any one of the previous embodiments, wherein the phenolic resin composition may further comprise one or more vapor suppressant(s) selected from magnesium-containing compound; manganese-containing compound; iron-containing compound; cobalt-containing compound; nickel-containing compound; copper-containing compound; tin-containing compound; phosphorus-containing compound; silicon-containing compound; aluminum-containing compound; zinc-containing compound; molybdenum-containing compound; boron-containing compound; zirconium-containing compound; vanadium-containing compound; chromium-containing compound, calcium-containing compound, tungsten-containing compound, titanium-containing compound, niobium-containing compound, cerium-containing compound and mixtures thereof.
10. The phenolic resin composition according to any one of the previous embodiments, wherein the phenolic resin composition may further comprises one or more vapor suppressant(s) selected from magnesium/aluminum alloy, talc (a magnesium silicate compound), hydrotalcite (a magnesium-aluminum hydroxycarbonate), molybdenum disulfide, molybdenum trioxide, calcium molybdate, ammonium octamolybdate, zinc oxide, zinc molybdate, zinc-magnesium alloy, zinc borate, zinc hydroxy stannate, zinc stannate, boron carbide, boron nitride, zirconium diboride, calcium hexaboride, chromium boride, zirconia, metallic zirconium, chromia, calcium carbonate, silane, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic vanadium, metallic chromium, metallic calcium, metallic tungsten, metallic titanium, metallic niobium, metallic cerium and mixtures thereof.
11. The phenolic resin composition according to any one of the previous embodiments, wherein the phenolic resin composition may further comprise one or more vapor suppressant(s) which is a combination of zinc molybdate and magnesium silicate.
12. The phenolic resin composition according to any one of the previous embodiments, wherein the phenolic resin composition may further comprise one or more vapor suppressant(s) which is one or more plant-based component(s).
13. The phenolic resin composition according to any one of the previous embodiments, wherein the phenolic resin composition may further comprise one or more vapor suppressant(s) which is one or more plant-based component(s) selected from wood, algae, corn, olive, soybean, peanut, walnut, almond, sesame, cottonseed, rapeseed, safflower, sunflower, flax, coconut, palm kernel and mixtures thereof.
14. The phenolic resin composition according to any one of the previous embodiments, wherein the phenolic resin composition may further comprise one or more vapor suppressant(s) which is lignin.
15. The phenolic resin composition according to any one of the previous embodiments, wherein the phenolic resin composition may further comprise one or more vapor suppressant(s) which is one or more plant-based component(s) selected from cellulose or a cellulose derivative, such as methyl cellulose, hydroxyl ethyl cellulose, methyl hydroxyl cellulose, hydroxyl methyl ethyl cellulose, carboxy methyl cellulose, methyl cellulose, ethyl cellulose, hydroxyl ethyl cellulose, hydroxyl ethyl propyl cellulose, and mixtures thereof.

16. The phenolic resin composition according to any one of the previous embodiments, wherein the phenolic resin composition may further comprise one or more vapor suppressant(s) which is one or more plant-based component(s) which is a derivative of a natural plant having a higher concentration of protein than the natural plant.
17. The phenolic resin composition according to any one of the previous embodiments, wherein the phenolic resin composition may further comprise one or more vapor suppressant(s) which is one or more plant-based component(s) derived from rapeseed.
18. The phenolic resin composition according to any one of the previous embodiments, wherein the phenolic resin composition may further comprise one or more vapor suppressant(s) present in an amount of 0.01 to 20 parts by weight per 100 parts by weight of the phenolic resin composition, or wherein the phenolic resin composition may further comprise one or more vapor suppressant(s) present in an amount of 0.1 to 15, or 0.5 to 13 parts by weight per 100 parts by weight of the phenolic resin composition.
19. The phenolic resin composition according to any one of the previous embodiments, wherein the phenolic resin composition may have a reduced noxious odor when compared to R-1 as measured during a step of heating the phenolic resin composition to at least 1000° C., wherein the noxious odor is measured with a human's nose or with a zNose 4300 gas chromatograph.
20. The phenolic resin composition according to any one of the previous embodiments, may further comprise one or more adhesion promotor(s); or one or more silane coupling agent(s); or 2-(3,4-epoxycyclohexyl) ethyltrimethoxysilane, glycidoxypropyltrimethoxysilane, or mixtures thereof.
21. A refractory composition comprising the phenolic resin composition according to any one of the previous embodiments and at least 50 wt. % of one or more refractory aggregate(s), or 60 to 98 wt. % of one or more refractory aggregate(s), or 60 to 80 wt. % of one or more refractory aggregate(s), based on a total weight of the refractory composition.
22. The refractory composition according to embodiment 21, wherein the one or more refractory aggregate(s) may be selected from magnesia, alumina or mixtures thereof, or the one or more refractory aggregates is selected from fused magnesias, sintered magnesias, mullites, bauxites, alumina-magnesia spinels and high-purity aluminas or mixtures thereof.
23. The refractory composition according to embodiment 21, wherein the one or more refractory aggregate(s) may be selected from bauxitic kaolin, alumina, spinel, mullite, graphite, pitch, bauxite, diaspore, gravel shale, chamotte, silica stone, pyrophyllite, sillimanite, andalusite, chromite, magnesia, zirconia, zircon, chromia, silicon nitride, aluminum nitride, boron carbide, titanium boride, zirconium boride or mixtures thereof.

24. The refractory composition according to any one of embodiments 21-23, wherein the average particle size of the one or more refractory aggregate(s) may be 30 mm or less, or 0.1 to 30 mm.
25. The refractory composition according to any one of embodiments 21-24, may further comprise one or more type(s) of carbon particulates.
26. The refractory composition according to any one of embodiments 21-25, may further comprise one or more type(s) of carbon particulates selected from natural flake graphite, vein graphite, synthetic graphite, expanded flake graphite, expandable graphite, carbon black, carbon fiber, powdered pitch and mixtures thereof.
27. The refractory composition according to any one of embodiments 21-26, may further comprise one or more anti-oxidation additive(s).
28. The refractory composition according to any one of embodiments 21-27, may further comprise one or more anti-oxidation additive(s) selected from metal, carbide, boride, and nitride or the one or more anti-oxidation additives are selected magnesium aluminum alloy, boron carbide, silicon carbide, zirconium diboride, calcium hexaboride, magnesium boride, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic zirconium, metallic vanadium, metallic chromium, metallic calcium, metallic tungsten, metallic titanium, metallic niobium, metallic cerium and mixtures thereof.
29. The refractory composition according to any one of embodiments 21-28, may further comprise one or more type(s) of carbon particulates in an amount of 2 to 20 wt. %, based on the total weight of the refractory composition.
30. The refractory composition according to any one of embodiments 21-29, may further comprise one or more anti-oxidation additive(s) in a range of 0.25 wt % to 5.0 wt %, based on the total weight of the refractory composition.
31. The refractory composition according to any one of embodiments 21-30, may further comprise one or more refractory fine powder(s).
32. The refractory composition according to any one of embodiments 21-31, may further comprise one or more refractory fine powder(s) selected from bauxitic kaolin, alumina, spinel, mullite, amorphous silica, silica, titania, carbon, clay, bauxite, diaspore, gravel shale, chamotte, pyrophyllite, sillimanite, andalusite, silica, chromite, magnesia, zirconia, zircon, chromia, silicon nitride, aluminum nitride, boron carbide, zirconium boride, titanium boride and mixtures thereof.
33. The refractory composition according to any one of embodiments 21-32, may further comprise one or more refractory fine powder(s) in an amount from 0.1 to 15 wt. %, based on the total weight of the refractory composition.
34. The refractory composition according to any one of embodiments 21-33, may further comprise one or more refractory fine powder(s) having an average particle size of 200 μm or less, or 45 μm or less.
35. The refractory composition according to any one of embodiments 21-34, may further comprise one or more resin(s) selected from a furan resin, an epoxy resin, a melamine resin and mixtures thereof.
36. A refractory article formed into a shape comprising said refractory composition according to any one of embodiments 21-35 and heating until the phenolic resin composition is at least 20% cured, or at least 50% cured, or at least 90% cured.
37. The refractory article according to embodiment 36, may have a green strength after curing at 170° C. for 5 hours sufficient for handling the solid without falling apart.
38. The refractory article according to any one of embodiments 36-37, may have a cold crush strength (CCS) of >0.5 MPa as measured by BS EN ISO 8895:2006.
39. The refractory article according to any one of embodiments 36-38, wherein the article may be a brick.
40. The refractory article according to any one of embodiments 36-39, may further comprise a metal cladding.
41. A ladle for transporting and pouring molten metals, wherein said ladle is formed with an inner liner formed by stacking at least two bricks according to embodiment 39 along the bottom and sides of a ladle shaped metal outer liner, and then heating the stacked bricks to a temperature sufficient to carbonize the resin thereby forming the inner liner of the ladle.
42. A method of making a refractory article, said method comprising:

mixing the refractory composition according to any one of embodiments 21-35 to form a charging mix;

pressing the charging mix into a mold to form a pressed refractory article; and curing the pressed refractory article at a temperature in a range between 145° C. to 375° C. to form the refractory article.

43. The method of embodiment 42, wherein the step of pressing of the charging mix may be at a pressure greater than 65 MPa.

In a second aspect, the present invention is drawn to:

1. A liquid phenolic resin composition for use as a binder for a refractory article, the phenolic resin composition comprising a phenol formaldehyde resin formed from one or more phenolic compound(s) (P) and one or more formaldehyde compound(s) (F), wherein the phenol formaldehyde resin is optionally formed in the presence of a reaction catalyst, said phenolic resin composition has the following feature (I) and/or (II), wherein feature (I) the phenol formaldehyde resin has a molar ratio (MR) of F to P of greater than 1.2, or greater than 1.2 to 1.9, and feature (II) the phenolic resin composition further comprises one or more vapor suppressant(s).

2. The phenolic resin composition according to the previous embodiment, wherein the phenolic resin composition may have a vaporization percentage of (P) as measured by the following steps:
   (a) curing 5 grams of liquid resin at 170° C. for 5 hours to form a solid;
   (b) cooling the solid to room temperature and then weighing 1 gram of the solid;
   (c) heating the 1 gram of solid in a tube furnace from room temperature to 1000° C. at 15° C./minute, and then being held at 1000° C. under an inert atmosphere for 10 minutes to form a vaporized composition;

(d) collecting the vaporized composition that vaporizes off from the solid in step (c);

(e) quantifying the amount of (P) that vaporized from the solid in step (c); and (f) determining the amount of the vaporized (P) as a percentage of the 1 gram of cooled solid in step (b);

wherein the vaporization percentage of the one or more phenolic compounds is less than a reference phenolic resin composition lacking both features (I) and (II).

3. The phenolic resin composition according to any one of the previous embodiments, wherein the vaporization percentage of the (P) may be less than 4.1%.
4. The phenolic resin composition according to any one of the previous embodiments, wherein the phenolic resin composition meets one or more of the following properties:
   a) viscosity may be from 50-10,000 cPs, or 4500-6500 cPs, as measured with a Brookfield RVF viscometer using a No. 1 spindle at 20 rpm, at 25° C.;
   b) pH may be 7 to less than 11;
   c) nonvolatile content may be 65-85 wt. % or 76-79 wt. %; and
   d) free formaldehyde may be of less than about 0.3 wt. %, or less than 0.1 wt. % or less than 0.05 wt. %.
5. The phenolic resin composition according to any one of the previous embodiments, wherein the vaporization percentage of the (P) may be less than Reference Sample R-1.
6. The phenolic resin composition according to any one of the previous embodiments, wherein the phenolic resin composition may have a reduced noxious odor when compared to Reference Sample R-1 as measured during a step of heating the phenolic resin composition to at least 1000° C., wherein the noxious odor is measured with a human's nose or with a zNose 4300 gas chromatograph.
7. The phenolic resin composition according to any one of the previous embodiments, wherein the phenolic resin composition may further comprise one or more vapor suppressant(s).
8. The phenolic resin composition according to any one of the previous embodiments, wherein the number average molecular weight (Mn) of the phenol formaldehyde resin may be less than 3000 g/mol, or less than 2000 g/mol, or less than 1000 g/mol, as measured by gel permeation chromatography (GPC).
9. The phenolic resin composition according to any one of the previous embodiments, wherein the weight average molecular weight (Mw) of the phenol formaldehyde resin may be less than 5000 g/mol, or less than 3000 g/mol, or less than 2000 g/mol as measured by GPC.
10. The phenolic resin composition according to any one of the previous embodiments, wherein the phenol formaldehyde resin may have a polydispersity (Mw/Mn) of less than 10, or less than 5, or less than 3.
11. The phenolic resin composition according to any one of the previous embodiments, wherein the phenolic resin composition may further comprise one or more vapor suppressant(s) selected from magnesium-containing compound; manganese-containing compound; iron-containing compound; cobalt-containing compound; nickel-containing compound; copper-containing compound; tin-containing compound; phosphorus-containing compound; silicon-containing compound; aluminum-containing compound; zinc-containing compound; molybdenum-containing compound; boron-containing compound; zirconium-containing compound; vanadium-containing compound; chromium-containing compound, calcium-containing compound, tungsten-containing compound, titanium-containing compound, niobium-containing compound, cerium-containing compound and mixtures thereof.
12. The phenolic resin composition according to any one of the previous embodiments, wherein the phenolic resin composition may further comprise one or more vapor suppressant(s) selected from magnesium/aluminum alloy, talc (a magnesium silicate compound), hydrotalcite (a magnesium-aluminum hydroxycarbonate), molybdenum disulfide, molybdenum trioxide, calcium molybdate, ammonium octamolybdate, zinc oxide, zinc molybdate, zinc-magnesium alloy, zinc borate, zinc hydroxy stannate, zinc stannate, boron carbide, boron nitride, zirconium diboride, calcium hexaboride, chromium boride, zirconia, chromia, calcium carbonate, silane, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic zirconium, metallic vanadium, metallic chromium, metallic calcium, metallic tungsten, metallic titanium, metallic niobium, metallic cerium and mixtures thereof.
13. The phenolic resin composition according to any one of the previous embodiments, wherein the phenolic resin composition may further comprise one or more vapor suppressant(s) which is a combination of zinc molybdate and magnesium silicate.
14. The phenolic resin composition according to any one of the previous embodiments, wherein the phenolic resin composition may further comprise one or more vapor suppressant(s) which is one or more plant-based component(s).
15. The phenolic resin composition according to any one of the previous embodiments, wherein the phenolic resin composition may further comprise one or more vapor suppressant(s) which is one or more plant-based component(s) selected from wood, algae, corn, olive, soybean, peanut, walnut, almond, sesame, cottonseed, rapeseed, safflower, sunflower, flax, coconut, palm kernel and mixtures thereof.
16. The phenolic resin composition according to any one of the previous embodiments, wherein the phenolic resin composition may further comprise one or more vapor suppressant(s) which is lignin.
17. The phenolic resin composition according to any one of the previous embodiments, wherein the phenolic resin composition may further comprise one or more vapor suppressant(s) which is one or more plant-based component(s) selected from cellulose or a cellulose derivative, such as methyl cellulose, hydroxyl ethyl cellulose, methyl hydroxyl cellulose, hydroxyl methyl ethyl cellulose, carboxy methyl cellulose, methyl cellulose, ethyl cellulose, hydroxyl ethyl cellulose, hydroxyl ethyl propyl cellulose, and mixtures thereof.
18. The phenolic resin composition according to any one of the previous embodiments, wherein the phenolic resin composition may further comprise one or more vapor suppressant(s) which is one or more plant-based component(s) which is a derivative of a natural plant having a higher concentration of protein than the natural plant.
19. The phenolic resin composition according to any one of the previous embodiments, wherein the phenolic resin composition may further comprise one or more vapor suppressant(s) which is one or more plant-based component(s) derived from rapeseed.
20. The phenolic resin composition according to any one of the previous embodiments, wherein the phenolic resin composition may further comprise one or more vapor suppressant(s) present in an amount of 0.01 to 20 parts by weight per 100 parts by weight of the phenolic resin composition, or wherein the phenolic resin composition further comprises one or more vapor suppressant(s) present in an amount of 0.1 to 15, or 0.5 to 13 parts by weight per 100 parts by weight of the phenolic resin composition.

21. The phenolic resin composition according to any one of the previous embodiments, wherein (P) may be phenol or derivatives of phenol.
22. The phenolic resin composition according to any one of the previous embodiments, wherein (P) may be selected from phenol, m-cresol, resorcinol, 3,5-xylenol, bisphenol A, dihydroxydiphenylmethane, o-cresol, p-cresol, p-tert-butylphenol, p-phenylphenol, p-cumylphenol, p-nonylphenol, 2,4-xylenol, 2,6-xylenol, halogenated derivatives thereof, and mixtures thereof.
23. The phenolic resin composition according to any one of the previous embodiments, wherein (F) may be selected from formalin, paraformaldehyde, acetaldehyde, benzaldehyde, trioxane, tetraoxane, furfuryl alcohol and mixtures thereof.
24. The phenolic resin composition according to any one of the previous embodiments, may further comprise one or more adhesion promotor(s); or one or more silane coupling agent(s); or 2-(3,4-epoxycyclohexyl) ethyltrimethoxysilane, glycidoxypropyltrimethoxysilane, or mixtures thereof.
25. A refractory composition comprising the phenolic resin composition according to any one of the previous embodiments and at least 50 wt. % of one or more refractory aggregate(s), or 60 to 98 wt. % of one or more refractory aggregate(s), or 60 to 80 wt. % of one or more refractory aggregate(s), based on the total weight of the refractory composition.
26. The refractory composition according to embodiment 25, wherein the one or more refractory aggregate(s) may be selected from magnesia, alumina or mixtures thereof, or the one or more refractory aggregates is selected from fused magnesias, sintered magnesias, mullites, bauxites, alumina-magnesia spinels and high-purity aluminas or mixtures thereof.
27. The refractory composition according to embodiment 25, wherein the one or more refractory aggregate(s) may be selected from bauxitic kaolin, alumina, spinel, mullite, graphite, pitch, bauxite, diaspore, gravel shale, chamotte, silica stone, pyrophyllite, sillimanite, andalusite, chromite, magnesia, zirconia, zircon, chromia, silicon nitride, aluminum nitride, boron carbide, titanium boride, zirconium boride or mixtures thereof.
28. The refractory composition according to any one of embodiments 25-27, wherein the average particle size of the one or more refractory aggregate(s) may be 30 mm or less, or 0.1 to 30 mm.
29. The refractory composition according to any one of embodiments 25-28, may further comprise one or more type(s) of carbon particulates.
30. The refractory composition according to any one of embodiments 25-29, may further comprise one or more type(s) of carbon particulates selected from natural flake graphite, vein graphite, synthetic graphite, expanded flake graphite, expandable graphite, carbon black, carbon fiber, powdered pitch and mixtures thereof.
31. The refractory composition according to any one of embodiments 25-30, may further comprise one or more anti-oxidation additive(s).
32. The refractory composition according to any one of embodiments 25-31, may further comprise one or more anti-oxidation additive(s) selected from metal, carbide, boride, and nitride or the one or more anti-oxidation additives are selected magnesium aluminum alloy, boron carbide, silicon carbide, zirconium diboride, calcium hexaboride, magnesium boride, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic zirconium, metallic vanadium, metallic chromium, metallic calcium, metallic tungsten, metallic titanium, metallic niobium, metallic cerium and mixtures thereof.
33. The refractory composition according to any one of embodiments 25-32, may further comprise one or more type(s) of carbon particulates in an amount of 2 to 20 wt. %, based on the total weight of the refractory composition.
34. The refractory composition according to any one of embodiments 25-33, may further comprise one or more anti-oxidation additive(s) in a range of 0.25 wt % to 5.0 wt %, based on the total weight of the refractory composition.
35. The refractory composition according to any one of embodiments 25-34, may further comprise one or more refractory fine powder(s).
36. The refractory composition according to any one of embodiments 25-35, may further comprise one or more refractory fine powder(s) selected from bauxitic kaolin, alumina, spinel, mullite, amorphous silica, silica, titania, carbon, clay, bauxite, diaspore, gravel shale, chamotte, pyrophyllite, sillimanite, andalusite, silica, chromite, magnesia, zirconia, zircon, chromia, silicon nitride, aluminum nitride, boron carbide, zirconium boride, titanium boride and mixtures thereof.
37. The refractory composition according to any one of embodiments 25-36, may further comprise one or more refractory fine powder(s) in an amount from 0.1 to 15 wt. %, based on the total weight of the refractory composition.
38. The refractory composition according to any one of embodiments 25-37, may further comprise one or more refractory fine powder(s) having an average particle size of 200 μm or less, or 45 μm or less.
39. The refractory composition according to any one of embodiments 25-38, may further comprise one or more resin(s) selected from a furan resin, an epoxy resin, a melamine resin and mixtures thereof.
40. A refractory article formed into a shape comprising said refractory composition according to any one of embodiments 25-39 and heating until the phenolic resin composition is at least 20% cured, or at least 50% cured, or at least 90% cured.
41. The refractory article according to embodiment 40, may have a green strength after curing at 170° C. for 5 hours sufficient for handling the solid without falling apart.
42. The refractory article according to any one of embodiments 40-41, may have a cold crush strength (CCS) of >0.5 MPa as measured by BS EN ISO 8895:2006.
43. The refractory article according to any one of embodiments 40-42, wherein the article may be a brick.
44. The refractory article according to any one of embodiments 40-43, may further comprise a metal cladding.

45. A ladle for transporting and pouring molten metals, wherein said ladle is formed with an inner liner formed by stacking at least two bricks according to embodiment 43 along the bottom and sides of a ladle shaped metal outer liner, and then heating the stacked bricks to a temperature sufficient to carbonize the resin thereby forming the inner liner of the ladle.

46. A method of making a refractory article, said method comprising:

mixing the refractory composition according to any one of embodiments 25-39 to form a charging mix;

pressing the charging mix into a mold to form a pressed refractory article; and curing the pressed refractory article at a temperature in a range between 145° C. to 375° C. to form the refractory article.

47. The method of embodiment 46, wherein the pressing of the charging mix may be at a pressure greater than 65 MPa.

Additional details and advantages of the disclosure will be set forth in part in the description which follows, and/or may be learned by practice of the disclosure. The details and advantages of the disclosure may be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION OF THE INVENTION

The phenolic resin compositions of the present invention have the advantage over current refractory binders by having reduced vaporization of an unwanted amount of noxious chemicals such as phenolic compounds during the heating steps while still being cost effective and able to meet performance requirements.

In a first aspect, the present invention is a liquid phenolic resin composition for use as a binder for a refractory article, the phenolic resin composition comprising a phenol formaldehyde resin wherein the phenolic resin composition has a vaporization percentage of phenol of less than 4.1% as measured by the following steps:

(a) curing 5 grams of liquid resin at 170° C. for 5 hours to form a solid;

(b) cooling the solid to room temperature and then weighing 1 gram of the solid;

(c) heating the 1 gram of solid in a tube furnace from room temperature to 1000° C. at 15° C./minute, and then being held at 1000° C. under an inert helium atmosphere for 10 minutes;

(d) collecting the composition that vaporizes off from the solid in step (c);

(e) quantifying the amount of phenol that vaporized from the solid in step (c); and (f) determining the amount of the vaporized phenol as a percentage of the 1 gram of cooled solid in step (b).

The vaporization percentage of the phenol may be less than Reference Sample R-1, which is discussed below. Moreover, the phenolic resin composition may have a reduced noxious odor when compared to R-1 as measured during a step of heating the phenolic resin composition to at least 1000° C.

In a second aspect, the present invention is a liquid phenolic resin composition for use as a binder for a refractory article, the phenolic resin composition comprising a phenol formaldehyde resin formed from one or more phenolic compound(s) (P) and one or more formaldehyde compound(s) (F), wherein the phenol formaldehyde resin is optionally formed in the presence of a reaction catalyst, said phenolic resin composition has the following feature (I) and/or (II), wherein feature (I) the phenol formaldehyde resin has a molar ratio (MR) of F to P of greater than 1.2, or greater than 1.2 to 1.9, and feature (II) the phenolic resin composition further comprises one or more vapor suppressant(s).

In the second aspect, the phenolic resin composition may have a vaporization percentage of the one or more phenolic compounds which is less than a reference phenolic resin composition lacking both features (I) and (II).

The phenolic resin composition may also meet one or more of the following properties:

e) viscosity is 50-10,000 cPs, or 4500-6500 cPs, as measured with a Brookfield RVF viscometer using a No. 1 spindle at 20 rpm, at 25° C.;

f) pH is 7 to less than 11;

g) nonvolatile content is 65-85 wt. % or 76-79 wt. %; and h) free formaldehyde of less than about 0.3 wt. %, or less than 0.1 wt. % or less than 0.05 wt. %.

Phenol Formaldehyde Resin

The phenol formaldehyde resin can be formed from phenolic compounds (sometimes referred to herein as (P)) and formaldehyde compounds (sometimes referred to herein as (F)) optionally reacting in the presence of a reaction catalyst. The term "phenols" refers to phenol and derivatives of phenol. For example, in addition to phenol, trifunctional compounds such as m-cresol, resorcinol and 3,5-xylenol, and tetrafunctional compounds such as bisphenol A and dihydroxydiphenylmethane. Bifunctional ortho or para substituted phenolic compounds such as o-cresol, p-cresol, p-tert-butylphenol, p-phenylphenol, p-cumylphenol, p-nonylphenol, 2,4 or 2,6-xylenol-substituted phenols can be employed, and also halogenated phenols substituted with chlorine or bromine can be used. Of course, in addition to selecting and using one of these, a plurality of types can be mixed and used, for example, two or more, or three or more of the phenolic compounds may be used.

As the formaldehyde compound, formalin in the form of an aqueous solution is optimal, but forms such as paraformaldehyde, acetaldehyde, benzaldehyde, trioxane, and tetraoxane can also be used. It can be used by replacing with furfuryl alcohol.

The blending ratio of the above aldehyde/formaldehyde compounds and phenolic compounds is preferably set so that the F:P molar ratio (MR) is in the range of 0.5 to 3.5. As a reaction catalyst, when preparing a novolac-type phenol resin; inorganic acids such as hydrochloric acid, sulfuric acid and phosphoric acid; organic acids such as oxalic acid, paratoluenesulfonic acid, benzenesulfonic acid and xylenesulfonic acid, and acetic acid; zinc or the like can be used. When preparing a resole-type phenolic resin, an alkaline earth metal oxide or hydroxide can be used, such as potassium hydroxide, and an aliphatic group such as dimethylamine, triethylamine, butylamine, dibutylamine, tributylamine, diethylenetriamine, or dicyandiamide. Primary, secondary, tertiary amine, aliphatic amines having aromatic rings such as N, N-dimethylbenzylamine, aromatic amines such as aniline and 1,5-naphthalenediamine, ammonia, hexamethylenetetramine, etc. Other divalent metal naphthenic acids and divalent metal hydroxides can also be used.

The novolac-type phenol resin and the resole-type phenol resin may be used singly or may be used by mixing both in an arbitrary ratio. Preferably, the phenolic resin composition is not a mixture of novolac-type phenol resin and the resole-type phenol resin. Various modified phenolic resins such as silicon modified, rubber modified, boron modified, etc. can be used. However, it does not matter whether the storage stability is stable or the refractory aggregate is acidic (for example, silica) or basic (for example, MgO). The novolac type phenol resin is most preferred. As a curing agent for the novolac type phenol resin, a resole type phenol resin, an epoxy resin, an isocyanate compound, hexamethylenetetramine, trioxane, tetraoxane or the like can be used. Moreover, the resole type phenolic resin can be cured by heating to 100° C., or higher, but a curing agent can also be used. As the curing agent, novolac type phenolic resin, epoxy resin, isocyanate compound, organic esters, alkylene carbonates, and the like can be used. In addition, as a curing catalyst for resole-type phenolic resins, inorganic acids such as hydrochloric acid and sulfuric acid, inorganic compounds such as aluminum chloride and zinc chloride, and organic acids such as benzenesulfonic acid, phenolsulfonic acid, and xylenesulfonic acid should be used. Preferably, the curing agent for either the novolac or resole resin is not an ester-functional curing agent.

The phenol-formaldehyde resins can be combined with additives such as urea; boron compounds such as boric acid and borax decahydrate; ethers such as glycol ethers which can be diethylene glycol monobutyl ether; alcohols such as ethylene glycol or 2 phenoxyethanol; and silanes.

The phenolic resin compositions comprising the phenol formaldehyde resins are preferably able to hold their shape without sidewall support. If the composition is not able to hold its shape, a thickening agent can be added. The thickening agent can be a plant-based component of cellulose or a cellulose derivative, such as methyl cellulose, hydroxyl ethyl cellulose, methyl hydroxyl cellulose, hydroxyl methyl ethyl cellulose, carboxy methyl cellulose, methyl cellulose, ethyl cellulose, hydroxyl ethyl cellulose, hydroxyl ethyl propyl cellulose, and the like.

The phenol-formaldehyde resins may have a number average molecular weight (Mn) of less than about 5000 g/mol, or less than about 4000 g/mol, or less than about 3500 g/mol, or less than about 3000 g/mol, or less than about 2500 g/mol, or less than about 2000 g/mol, as measured by gel permeation chromatography (GPC) using commercially available polystyrene standards (with a number average molecular weight of 180 to about 18,000 as the calibration reference). The phenol-formaldehyde resins may have a weight average molecular weight (Mw) of less than about 5000 g/mol, or less than about 4000 g/mol, or less than about 3000 g/mol, or less than about 3500 g/mol, or less than about 2000 g/mol, as measured by GPC. The polydispersity (Mw/Mn) of the phenol formaldehyde resin may be less than 10, or less than 5, or less than 3.

Vapor Suppressant

The vapor suppressant of the present invention has the property of being able to reduce the vaporization percentage of the (P) from the phenol formaldehyde resin when heated to 1000° C. For instance, if a refractory composition comprising a phenol-formaldehyde resin lacking the vapor suppressant volatilizes 5 wt. % phenol upon heating to 1000° C., then essentially the same refractory composition comprising a phenol-formaldehyde resin with the vapor suppressant will volatilize 4.25 wt. % or less phenol which is at least 15% reduction in phenol vaporization. Preferably, there is at least 15%, or at least 20%, or at least 25% in phenol (or phenolic compound) vaporization.

The vapor suppressant can be selected from magnesium-containing compound; manganese-containing compound; iron-containing compound; cobalt-containing compound; nickel-containing compound; copper-containing compound; tin-containing compound; phosphorus-containing compound; silicon-containing compound; aluminum-containing compound; zinc-containing compound; molybdenum-containing compound; boron-containing compound; zirconium-containing compound; vanadium-containing compound; chromium-containing compound, calcium-containing compound, tungsten-containing compound, titanium-containing compound, niobium-containing compound, cerium-containing compound and mixtures thereof. Preferably, the vapor suppressant can be magnesium/aluminum alloy, talc (a magnesium silicate compound), hydrotalcite (a magnesium-aluminum hydroxycarbonate), molybdenum disulfide, molybdenum trioxide, calcium molybdate, ammonium octamolybdate, zinc oxide, zinc molybdate, zinc-magnesium alloy, zinc borate, zinc hydroxy stannate, zinc stannate, boron carbide, boron nitride, zirconium diboride, calcium hexaboride, chromium boride, zirconia, metallic zirconium, chromia, calcium carbonate, silane, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic vanadium, metallic chromium, metallic calcium, metallic tungsten, metallic titanium, metallic niobium, metallic cerium or mixtures thereof. Most preferably, the vapor suppressant is a combination of zinc molybdate and magnesium silicate.

In the alternative, the vapor suppressant can be one or more plant-based component(s). For instance, the plant-based component may be selected from wood, algae, corn, olive, soybean, peanut, walnut, almond, sesame, cottonseed, rapeseed, safflower, sunflower, flax, coconut, palm kernel and mixtures thereof. Preferably, the vapor suppressant is lignin or is derived from rapeseed. Also, the plant-based component is selected from cellulose or a cellulose derivative, such as methyl cellulose, hydroxyl ethyl cellulose, methyl hydroxyl cellulose, hydroxyl methyl ethyl cellulose, carboxy methyl cellulose, methyl cellulose, ethyl cellulose, hydroxyl ethyl cellulose, hydroxyl ethyl propyl cellulose, and mixtures thereof. In a preferred embodiment, the plant-based component is a derivative of a natural plant having a higher concentration of protein than the natural plant.

The one or more vapor suppressant(s) can be present in an amount of 0.01 to 20 parts by weight per 100 parts by weight of the phenolic resin composition, or 0.1 to 15 or 0.5 to 13 parts by weight per 100 parts by weight of the phenolic resin composition.

When utilized, adhesion promoters are useful to further increase adhesion between the phenol formaldehyde resin and the refractory aggregates. Various types of adhesion promoters can be utilized. Examples of suitable adhesion promoters (or coupling agents) include those based on silane coupling agents and/or titanate coupling agents. Examples of suitable adhesion promoters are silane coupling agents such as 2-(3,4-epoxycyclohexyl) ethyltrimethoxysilane, or glycidoxypropyltrimethoxysilane. Although not required, the adhesion promoter can be used in various amounts. In certain embodiments, the adhesion promoter (s) is present in an amount of about 0.01 to about 3 wt. %, about 0.1 to about 2 wt. %, about 0.25 to about 1 wt. %, respectively, based on the total weight of the phenolic resin composition.

Refractory Composition

A refractory composition can be obtained by blending the inventive phenolic resin composition which optionally comprises one or more vapor suppressant(s) with refractory aggregates and/or refractory fine powder, and further blending and kneading other components, such as a coupling agent, if necessary. The inventive phenol formaldehyde resins can be blended with another thermosetting resin, such as a furan resin, an epoxy resin, a melamine resin, and the like. These may be used singly or in combination of two or more, and tar/pitch may be used in combination.

The refractory composition can have at least 50 wt. % of one or more refractory aggregate(s), or 60 to 98 wt. % of one or more refractory aggregate(s), or 60 to 80 wt. % of one or more refractory aggregate(s), based on the total weight of the refractory composition.

The refractory aggregate can be selected from magnesia, alumina or mixtures thereof, or the one or more refractory aggregates is selected from fused magnesias, sintered magnesias, mullites, bauxites, alumina-magnesia spinels and high-purity aluminas or mixtures thereof. Preferably, the refractory aggregate is selected from bauxitic kaolin, alumina, spinel, mullite, graphite, pitch, bauxite, diaspore, gravel shale, chamotte, silica stone, pyrophyllite, sillimanite, andalusite, chromite, magnesia, zirconia, zircon, chromia, silicon nitride, aluminum nitride, boron carbide, titanium boride, zirconium boride and mixtures thereof. The refractory aggregate can be used in the raw, sintered or fused form as appropriate. The average particle size of the refractory aggregate can be 30 mm or less, or 0.1 to 30 mm. The average particle size of the refractory aggregate is a volume-based cumulative 50% diameter (D50) obtainable by a laser diffraction scattering method. That is, the particle size distribution is measured by a laser diffraction scattering method, and a cumulative curve is obtained by setting the total volume of the group of particles as 100%, whereby a particle diameter at a point where the cumulative volume on the cumulative curve becomes 50% is taken as the average particle size.

The refractory composition can also comprise one or more type(s) of carbon particulates. The carbon particulates can be natural flake graphite, vein graphite, synthetic graphite, expanded flake graphite, expandable graphite, carbon black, carbon fiber, powdered pitch or mixtures thereof.

The refractory composition can also comprise one or more anti-oxidation additive(s). The anti-oxidation additive can be metal, carbide, boride, and nitride or the one or more anti-oxidation additives are selected magnesium aluminum alloy, boron carbide, silicon carbide, zirconium diboride, calcium hexaboride, magnesium boride, metallic magnesium, metallic manganese, metallic iron, metallic cobalt, metallic nickel, metallic copper, metallic tin, metallic phosphorus, metallic silicon, metallic aluminum, metallic zinc, metallic molybdenum, metallic boron, metallic zirconium, metallic vanadium, metallic chromium, metallic calcium, metallic tungsten, metallic titanium, metallic niobium, metallic cerium or mixtures thereof.

In addition, the one or more type(s) of carbon particulates can be present in an amount of 2 to 20 wt. %, based on the total weight of the refractory composition, and the one or more anti-oxidation additive(s) can be present in a range of 0.25 wt % to 5.0 wt %, based on the total weight of the refractory composition.

The refractory composition may also comprise one or more refractory fine powder(s). The refractory fine powder can be selected from bauxitic kaolin, alumina, spinel, mullite, amorphous silica, silica, titania, carbon, clay, bauxite, diaspore, gravel shale, chamotte, pyrophyllite, sillimanite, andalusite, silica, chromite, magnesia, zirconia, zircon, chromia, silicon nitride, aluminum nitride, boron carbide, zirconium boride, titanium boride and mixtures thereof. The refractory aggregate can be used in the raw, sintered or fused form as appropriate. Preferably, the refractory fine powder is present in an amount from 0.1 to 15 wt. % based on the weight of the refractory composition. The refractory fine powder can have an average particle size of 200 μm or less, or 45 μm or less. The average particle size of the refractory aggregate is a volume-based cumulative 50% diameter (D50) obtainable by a laser diffraction scattering method as discussed above.

The refractory composition can be prepared by blending and kneading the phenolic resin composition which is incorporated as a binder with the refractory aggregate. The kneading can be performed using any kneading apparatus such as a Simpson mill, Melanger, Eirich, Speed Maller, or Whirlmix.

Refractory Article

Next, a refractory article can be formed into a shape comprising said refractory composition and heating until the phenolic resin composition is at least 20% cured, or at least 50% cured, or at least 90% cured. By molding the refractory composition prepared as described above, a molded product shaped using an uncured binder as a binder can be obtained. Molding can be performed using an arbitrary press device such as an oil press, a friction press, a vacuum press, or an isostatic press at a pressure greater than 65 MPa.

After pressing the refractory composition, the pressed refractory article may be cured at a temperature in the range of from about 145° C. to about 375° C. The refractory article preferably has a green strength after curing at 170° C. for 5 hours sufficient for handling the solid without falling apart. The refractory article can have a cold crush strength (CCS) of >0.5 MPa as measured by BS EN ISO 8895:2006.

A refractory article can be obtained by heat-treating a molded product prepared by molding a refractory composition as described above and drying, curing, or carbonizing the binder in the molded product.

Therefore, with a short heat treatment, the binder in the molded product can be dried and solidified, the binder can be cured, or the binder can be cured until it is carbonized. Products can be manufactured with high productivity. At this time, the phenolic resin composition binder can be cured at a temperature higher than the curing temperature of the phenolic resin composition binder.

Of course, the molded product may be heat-treated not only in two stages but also in a plurality of stages in which the temperature is increased in each stage, such as three stages or four stages. Further, as the first stage, after the heat treatment at about 150° C. or less, which is hardly affected by oxidation, is performed by a conventional arbitrary method.

In an embodiment, the molded product is in the shape of a brick.

In another embodiment, the refractory article can further comprise a metal cladding.

Ladle

A ladle for transporting and pouring molten metals can be formed with an inner liner formed by stacking at least two bricks along the bottom and sides of a ladle shaped metal outer liner, and then heating the stacked bricks to a temperature sufficient to carbonize the resin thereby forming the inner liner of the ladle. It is during this carbonization step, that the noxious odor is most pronounced. One advantage is the reduction of the noxious odor caused by the vaporization of phenolic compounds from the phenolic resin composition during the carbonization step.

Definitions (ROOM TEMPERATURE) Room temperature is defined to be from about 20-25° C., preferably 23° C.

(NOXIOUS ODOR) A noxious odor is an unpleasant odor. Herein, a phenol vapor is considered to have a noxious odor. Phenol has a distinct odor that is sickeningly sweet and tarry.

One can taste and smell phenol at low levels.

(WATER DILUTION FACTOR) The water dilution factor is a test of whether the condensation is carried to completion. Initially the mixture may be diluted with water without precipitating. For instance, a water dilution factor of 200% means that when 10 mL of the mixture is added to 20 mL of water, solids will precipitate out of solution.

(PHENOL VAPORIZATION PERCENTAGE) The phenol vaporization percentage is measured by the following steps: (a) curing 5 grams of liquid resin at 170° C. for 5 hours to form a solid; (b) cooling the solid to room temperature (preferably 23° C.) and then weighing 1 gram of the solid; (c) performing a pyrolysis step by heating the 1 gram of solid in a tube furnace from room temperature to 1000° C. at 15° C./minute, and then being held at 1000° C. under an inert helium atmosphere for 10 minutes; (d) collecting the composition that vaporizes off from the solid in step (c); and (e) the phenol is separated from the other vaporized compounds. The phenol vaporization percentage is calculated by dividing the weight of the phenol collected from the 1 gram sample and multiplying by 100. In other words, if 0.04 g phenol is collected from a 1 gram sample, then the phenol vaporization percentage is 4%.

(FREE PHENOL) Free phenol in the phenolic resin compositions was analyzed by gas chromatography with a flame ionization detector after dilution in methanol containing o-cresol as an internal standard.

The "phenol vaporization percentage" is not a measure of the "free phenol". U.S. Pregrant Publication No. 2008/0280787A1 discloses foundry novolac resins (MR<1) having low free phenol content. This publication teaches the removal of the residual phenol "by any of several established techniques, including heating, preferably with a vacuum assist, azeotropic distillation and thin film evaporation." See paragraph [0011]. The goal of U.S. Pregrant Publication No. 2008/0280787A1 is to obtain a solid novolac resin composition containing less than 1.5% "free phenol", see claim 1. In order to maintain sufficiently low viscosity of the resin to mix with the aggregates, a non-phenol solvent is added.

On the other hand, in the measurement method of the present disclosure for measuring the phenol vaporization percentage, by the end of the curing for 5 hours at 170° C., the "free phenol" approaches zero. Since the phenolic resins are resoles, they are still thermally reactive and most, if not all, starting free phenol will be reacted into and covalently bonded to the now crosslinked polymer. Additionally, some free phenol may evaporate as an azeotrope with water. Also, a substantial amount would be lost over the 5 hour period due to simple evaporation as phenol's vapor pressure is going to be roughly 0.75 atm at that temperature.

As such, little to no (less than 0.001 g) residual free phenol is expected to be present after this curing step performed for 5 hours at 170° C. The pyrolysis emissions is a measure of how these almost fully crosslinked polymers decompose during thermal "cracking". Without being bound to theory, it is believed that this measurement is a test as to whether the phenolic resin formulation favors pyrolytic decomposition into unwanted phenolic monomers, or does it instead favor decomposition into $CO_2$, carbon char or other non-phenolics when pyrolyzed. The "free phenol" in the starting resin of U.S. Pregrant Publication No. 2008/0280787A1 therefore has little direct relationship to the phenol that vaporizes during the pyrolysis step which is performed after curing for 5 hours at 170° C.

(% NV) The percent non-volatiles reflects the change in mass during initial oven curing for 5 hours at 170° C. The % NV is simply the oven-cured resin weight divided by the starting liquid resin weight (nominally 5 g).

(LIQUID) The term "liquid" as used herein is defined as a state of the composition at room temperature and one atmosphere pressure wherein the composition is capable of conforming to the shape of a container holding the liquid without the need for added force.

(VISCOSITY) The viscosity is measured with a Brookfield RVF Viscometer using a No. 1 spindle at 20 rpm and at 25° C.

(GEL TIME) For the determination of the gel time, a Sunshine Gel Time Meter from Sunshine Scientific Instruments is used at 132° C.

(FREE FORMALDEHYDE PERCENTAGE) The measurement for free formaldehyde is based on the liberation of hydrochloric acid when hydroxylamine hydrochloride reacts with formaldehyde to form formaldoxime:

$$CH_2O(aq.)+NH_2OH\ HCl \rightarrow CH_2{=}NOH+H_2O+HCl$$

Titration of the free hydrochloric acid gives the amount of free formaldehyde present. Methyl alcohol and water is added to the sample to ensure the solubility of the resin during the test.

(METALLIC) The term "metallic" is used herein to refer to essentially pure metal, such as at least 97% pure, as opposed to a salt. For instance the term "metallic magnesium" refers to magnesium powder or magnesium metal (shavings or ingot) that could be obtained by electrolysis of magnesium salts obtained from brine.

(GREEN STRENGTH) The green strength after curing the refractory composition in a range between 145° C. to 375° C. may be sufficient for handling the resultant solid without falling apart. The cold crush strength (CCS) can be >0.5 MPa as measured by BS EN ISO 8895:2006.

(DENSITY AFTER CURING) Density after curing is measured by ASTM C134.

(POROSITY (AND DENSITY) AFTER COKING) Porosity (and density) after coking is measured by ASTM C20.

(COLD CRUSH STRENGTH AFTER COKING) Cold crush strength after coking is measured by ASTM C133.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. All patents and publications cited herein are fully incorporated by reference herein in their entirety.

Phenolic Resin Composition

Comparative Example 1 (Reference Example R-1)

In a vessel, a first set of components are mixed. Initially, 60-80 parts phenol (100%) are combined while stirring with 0.0.5-1.5 parts of a weak base. The temperature is maintained within 50° C. to 80° C. Then 1-7 parts of formaldehyde (52.5% solution) are added and the temperature is increased within 70° C. to 90° C. and the mixture is stirred for up to 20 minutes. The second set of components are then added. 37 to 50 parts of formaldehyde are added and the temperature is maintained within 70° C. to 95° C. until the water dilution factor is 100%-200%. The temperature is decreased to be within 40° C. to 70° C. and 0.2 to 1 parts of a formaldehyde scavenger is added with stirring. The mixture is distilled to remove unreacted components. Ethylene glycol is added and the mixture is stirred for an additional 15-60 minutes. The pH is measured and adjusted to be 7-10 with the use of acid or caustic if necessary. The viscosity is measured and if the viscosity is above 6500 cPs, the viscosity is modified with the addition of ethylene glycol to be within the range of 4500-6500 cPs. The mixture is then cooled to room temperature. All parts are by weight. The MR is 1.2.

Phenolic Resin Compositions Containing Vapor Suppressant

Inventive Examples 1-3

The process of Comparative Example 1 is essentially repeated except that 2 to 7 parts of the vapor suppressant described in the following Table 1 are added in place of an equal amount of phenol and formaldehyde. All parts are by weight. The MR is 1.1-1.4.

Measurement of Vaporization Percentage of Phenol and Other Aromatics from the Phenol Formaldehyde Resin In order to test for the vaporization percentage of phenol, and other aromatics, from the phenol formaldehyde resins, samples (0.3-5 g) were placed in a glass boat and then the glass boat was placed in a tube of a tube furnace. The tube was purged with helium gas and the sample was pyrolyzed by heating from 25° C. to 1000° C. at 15° C./minute and then held at 1000° C. for an additional 10 minutes. The process tube was purged with helium and the exiting gases are passed through a liquid nitrogen cooled vacuum trap and a midget impinger containing 10 mL water.

After warming to room temperature, the vacuum trap was washed and diluted with 10 ml of MeOH, while the midget impinger solution was quantitatively transferred and diluted to ~25 ml with $H_2O$.

Separation, identification, and quantification of the evolved species trapped in the vacuum trap and impinger was performed by HPLC equipped with a UV diode using a methanol and trifluoroacetate mixed solvent. Peaks were identified using commercially available phenolic and aromatic standards.

TABLE 1

| Vapor Suppressants | | |
|---|---|---|
| | Vapor Suppressant | Average Phenol Volatile (%) |
| R-1 | None | 4.1 |
| IE-1 | Kemgard 911C | 3.3 |
| IE-2 | Stora Enso Kraft Lignin | 3.7 |
| IE-3[a] | Lignosulfonate | 3.3 |

[a]Inventive Example 3 showed good reduction in phenol volatile percentage, but the sulfur in the lignosulfonate volatilized to give off an offensive odor.

High MR Phenolic Resins

Inventive Example 4

Comparative Example 1 was essentially repeated except that the relative amount of phenol and formaldehyde was modified to give a resin having an MR of 1.7 and an alkaline hydroxide was used rather than a weak base.

Inventive Example 5

In a vessel, a first set of components are mixed. Initially, 40-60 parts phenol (100%) are combined while stirring with an alkaline hydroxide (45% solution) and 1 to 10 parts of water. The temperature is maintained within 50° C. to 80° C. Then 40-60 parts of formaldehyde (52.5% solution) are added, and the temperature is increased within 70° C. to 90° C. and the mixture is stirred until the viscosity reaches the range of 4500-6500 cPs. The mixture is cooled to 45-60° C. The mixture is distilled to remove unreacted components. The mixture is cooled to 20-40° C. 0.1 to 1 parts of a silane adhesion promoter is added with stirring, and the mixture is stirred for an additional 15-30 minutes. The MR is 1.5-1.8, the Mn is 600 g/mol and the Mw is 1200 g/mol.

All parts are by weight. The properties of this resin and the entire emissions profile are given in the following table.

TABLE 2

| Properties | Inventive Example 5 |
|---|---|
| NV, % | 67.3 |
| Free Phenol, % | 2.21 |
| Free HCHO, % | 0.03 |
| Viscosity, cPs | 5450 |
| Gel Time @132° C., min | 9.74 |
| Emissions during Pyrolysis step | Average |
| Phenol | 2.30 |
| Cresol | 0.51 |
| 2,4-dimethylphenol | 0.04 |
| 2,6-dimethylphenol | 0.005 |
| m,p-xylene | 0.06 |
| Toluene | 0.06 |
| 2,4,6-trimethylphenol | 0.006 |
| 4-hydroxybenzyl alcohol | 0 |
| Benzene | 0.007 |
| Total Identified | 2.99 |

Inventive Example 6

In a vessel, a first set of components are mixed. Initially, 18-27 parts phenol (100%) are combined while stirring with an alkaline hydroxide (45% solution) and 1 to 10 parts of water. The temperature is maintained within 50° C. to 80° C. Then 18-27 parts of formaldehyde (52.5% solution) are added, and the temperature is increased within 70° C. to 90° C. and the mixture is stirred until the viscosity reaches the range of 4500-6500 cPs. The mixture is cooled to 45-60° C. The mixture is distilled to remove unreacted components. The mixture is cooled to 20-40° C. 2 to 7 parts of one or more boron-containing compounds, 1 to 5 parts of an ether solvent, 1 to 5 parts of an alcohol, and 0.1 to 1 parts of a silane adhesion promoter are added with stirring, and the mixture is stirred for an additional 15-30 minutes. The MR is 1.5-1.8. All parts are by weight.

TABLE 3

| High MR PF Resins | | |
|---|---|---|
| | MR | Phenol Volatile (%) |
| R-1 | 1.2 | 4.1 |
| IE-4 | 1.7 | 3.6 |
| IE-5[a] | 1.5-1.8 | 2.3 |
| IE-6 | 1.5-1.8 | 0.6 |

[a]Inventive Example 5 was prepared with a silane adhesion promoter.

zNose 4300 Gas Chromatograph.

The zNose 4300 gas chromatograph can be used to quantify odors emitted during the pyrolization/carbonization step. Odors with concentrations above 400 cts can be quantified. The quantity of each detected compound is given in cts, which is a conventional unit, used in the gas chromatography with SAW (surface acoustic wave interferometer) odor detector. The decomposition products which can be detected with odors are summarized in Table 4 and further characterized in Table 5.

TABLE 4

Fragrances that are expected to be emitted from resins in an inert atmosphere at 700° C.

| No. | The name of the chemical compound | The smell of the chemical compound | Resol cts | Novolac crosslinked with hexamethylene diamine cts |
|---|---|---|---|---|
| 1. | Heptanol | herbal | 1130 | 1260 |
| 2. | Phenol | spicy, tarry | 1440 | — |
| 3. | disulfide (2-methyl-3-furyl) | sulfuric, roasted meat | 5710 | 850 |
| 4. | diethyl malate | fruity | 2540 | — |
| 5. | ethyl palmitate | waxy | 710 | — |
| 6. | Toluene | spicy, sweet, similar to benzene | — | 630 |
| 7. | Myrcene | spicy, balsamic, musty | — | 3870 |
| 8. | α-ocimene | oily | — | 2020 |
| 9. | Dihydromyrcenol | citrus | — | 400 |
| 10. | curing aldehyde 2,6-nonadienal | cucumber, waxy, grassy | — | 1320 |
| 11. | butyl octoate | sweet, fruity | — | 490 |
| 12. | Cedrenol | fruity | — | 850 |

Refractory Brick Preparation

The phenolic resin compositions were then used in the production of samples of resin bonded magnesia-carbon brick. The brick was produced under equal conditions utilizing the standard manufacturing process. All 3 brick products were simultaneously tested for physical parameters and for slag corrosion resistance. The preparation and the results are summarized as follows:

The master batch was composed from 3 fractions of high purity fused magnesia in total proportion of 79%; 1 fraction of magnesia fines in 9% proportion, 2 qualities of graphite and carbon in total proportion of 12%. This master batch was further modified with 3% addition of the phenolic resin composition and small additions of additives, such as aluminum metal or boron carbide.

All individual batches were then mixed in a flat Eirich mixer with pin rotor for a total of 6 minutes. The mixed material was further pressed in a hydraulic press at a pressure of 124 MPa (18,000 PSI). After pressing, the shapes were cured at 177° C. (350 F) for 12 hours.

The cured and finished products were then tested for typical physical properties. The results for Plain compositions are summarized in Table 5. Compositions with aluminum metal addition in Table 6 and compositions with boron carbide metal in Table 7.

TABLE 5

Results from tests Plain compositions

| Phenolic Resin Composition | Units | R-1 | IE-1 | IE-5 |
|---|---|---|---|---|
| Bulk Density after curing | $Kg/m^3$ (pcf) | 3076 (192) | 3060 (191) | 3044 (190) |
| Bulk Density after coking @ 982° C. (1800° F.) | $Kg/m^3$ (pcf) | 2947 (184) | 2947 (184) | 2995 (187) |
| Porosity after coking @ 982° C. (1800° F.) | % | 8.9 | 9.1 | 8.7 |
| Cold Crushing Strength after coking @ 982° C. (1800° F.) | MPa (PSI) | 17.0 (2460) | 18.9 (2740) | 18.5 (2680) |

TABLE 6

Results from tests Compositions with 2% of Al metal

| Phenolic Resin Composition | Units | R-1 | IE-1 | IE-5 |
|---|---|---|---|---|
| Bulk Density after curing | $Kg/m^3$ (pcf) | | | |
| Bulk Density after coking @ 982° C. (1800° F.) | $Kg/m^3$ (pcf) | 2899 (181) | 2963 (185) | 2979 (186) |
| Porosity after coking @ 982° C. (1800° F.) | % | 10.3 | 8.7 | 9.0 |
| Cold Crushing Strength after coking @ 982° C. (1800° F.) | MPa (PSI) | 14.2 (2060) | 24.8 (3590) | 14.2 (2060) |
| Slag Corrosion per hour | $mm^2/hr$ | 27-31 | 35-45 | 31-50 |

TABLE 7

Results from tests Compositions with 0.4% of Boron Carbide

| Phenolic Resin Composition | Units | R-1 | IE-1 | IE-5 |
|---|---|---|---|---|
| Bulk Density after curing | $Kg/m^3$ (pcf) | | | |
| Bulk Density after coking @ 982° C. (1800° F.) | $Kg/m^3$ (pcf) | 2979 (186) | 2963 (185) | 2995 (187) |
| Porosity after coking @ 982° C. (1800° F.) | % | 8.0 | 8.5 | 8.3 |
| Cold Crushing Strength after coking @ 982° C. (1800° F.) | MPa (PSI) | 21.5 (3120) | 21.8 (3160) | 16.3 (2370) |
| Slag Corrosion per hour | $mm^2/hr$ | 35-55 | 35-56 | 27-31 |

Overall, the physical properties for the samples prepared with the inventive phenolic resin compositions were comparable to comparative phenolic resin composition. The phenolic resin compositions of Inventive Examples 1 and 5 met the performance requirements.

The results from all the tests which characterized the emission, composition and odors of the experimental organic resins indicate significant reduction of the emissions and significant decrease in harmful and nauseating fumes when compared to standard phenolic resin. In addition, test results which characterized the physical and corrosion properties of refractory shapes produced with the use of the experimental resins indicate comparable attributes to products manufactured with standard phenolic resins.

Other embodiments of the present disclosure will be apparent to those skilled in the art from consideration of the specification and practice of the embodiments disclosed herein. As used throughout the specification and claims, "a"

and/or "an" and/or "the" may refer to one or more than one. Unless otherwise indicated, all numbers expressing quantities, proportions, percentages, or other numerical values are to be understood as being modified in all instances by the term "about." Accordingly, unless indicated to the contrary, the numerical parameters set forth in the specification and claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1-4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

We claim:

1. A liquid phenolic resin composition for use as a binder for a refractory article, the phenolic resin composition comprising a phenol formaldehyde resin and one or more vapor suppressant(s) selected from the group consisting of magnesium containing compound; manganese-containing compound; iron-containing compound; cobalt-containing compound; nickel-containing compound; copper-containing compound; tin-containing compound; phosphorus-containing compound; silicon containing compound, wherein the silicon containing compound excludes silane; aluminum-containing compound; zinc-containing compound; molybdenum-containing compound; boron-containing compound; zirconium-containing compound; vanadium-containing compound; chromium-containing compound, calcium-containing compound, tungsten-containing compound, titanium-containing compound, niobium-containing compound, cerium-containing compound and mixtures thereof, and the phenolic resin composition comprises the one or more vapor suppressant(s) in an amount of 0.01 to 20 parts by weight per 100 parts by weight of the phenolic resin composition; and wherein the phenolic resin composition has a) a pH of from 7 to less than 11;

b) a nonvolatile content is 65 wt. % to 85 wt. %;

c) a free formaldehyde of less than about 0.3 wt. %;

d) a viscosity of from 4500 cPs to 6500 cPs, and as measured with a Brookfield RVF viscometer using a No. 1 spindle at 20 rpm, at 25° C.;

e) the phenol formaldehyde resin has a 0.5 to 1.5 parts of alkaline hydroxide or weak base per 60 to 80 parts of phenol; and f) a vaporization percentage of phenol of less than a vaporization percentage of Reference Sample R-1, wherein the vaporization percentage of phenol of Reference Sample R-1 is 4.1%, wherein the vaporization percentage of phenol is measured by the following steps:

(a) curing 5 grams of liquid resin at 170° C. for 5 hours to form a solid;

(b) cooling the solid to room temperature and then weighing 1 gram of the solid;

(c) heating the 1 gram of solid in a tube furnace from room temperature to 1000° C. at 15° C./minute, and then being held at 1000° C. under an inert atmosphere for 10 minutes to form a vaporized composition;

(d) collecting the vaporized composition that vaporizes off from the solid in step (c);

(e) quantifying the amount of phenol that vaporized from the solid in step (c); and (f) determining the amount of the vaporized phenol as a percentage of the 1 gram of cooled solid in step (b), wherein the Reference Sample R-1 is a phenolic resin composition having a molar ratio of formaldehyde to phenol of 1.2, a pH of from about 7-10 pH and a viscosity of from 4500 cPs-6500 cPs.

2. The phenolic resin composition according to claim 1, wherein the number average molecular weight (Mn) of the phenol formaldehyde resin is less than 3000 g/mol as measured by gel permeation chromatography (GPC), or the weight average molecular weight (Mw) of the phenol formaldehyde resin is less than 5000 g/mol, as measured by GPC, or the phenol formaldehyde resin has a polydispersity (Mw/Mn) is less than 10.

3. The phenolic resin composition according claim 1, further comprising one or more adhesion promotor(s).

4. The phenolic resin composition according claim 3, wherein the one or more adhesion promotor(s) is one or more silane coupling agent(s).

5. A refractory composition comprising the phenolic resin composition according to claim 1 and at least 50 wt. % of one or more refractory aggregate(s), based on a total weight of the refractory composition.

6. A refractory article formed into a shape comprising said refractory composition according to claim 5 and heating until the phenolic resin composition is at least 20% cured and having a green strength after curing at 170° C. for 5 hours sufficient for handling a solid without falling apart.

7. The refractory article according to claim 6, wherein the article is a brick.

8. A ladle for transporting and pouring molten metals, wherein said ladle is formed with an inner liner formed by stacking at least two bricks according to claim 7 along the bottom and sides of a ladle shaped metal outer liner, and then heating the stacked bricks to a temperature sufficient to carbonize the resin thereby forming the inner liner of the ladle.

9. A liquid phenolic resin composition for use as a binder for a refractory article, the phenolic resin composition comprising a phenol formaldehyde resin, and one or more vapor suppressant(s) selected from the group consisting of a combination of zinc molybdate and magnesium silicate, and the phenolic resin composition comprises the one or more vapor suppressant(s) in an amount of 0.01 to 20 parts by weight per 100 parts by weight of the phenolic resin composition; and wherein the phenolic resin composition has a) a pH of from 7 to less than 11, b) a nonvolatile content is 65 wt. % to 85 wt. %;

c) a free formaldehyde of less than about 0.3 wt. %;

d) a viscosity of from 4500 cPs to 6500 cPs, and as measured with a Brookfield RVF viscometer using a No. 1 spindle at 20 rpm, at 25° C., e) the phenol formaldehyde resin has 0.5 to 1.5 parts of alkaline hydroxide or weak base per 60 to 80 parts of phenol; and f) a vaporization percentage of phenol of less than a vaporization percentage of Reference Sample R-1, wherein the vaporization percentage of phenol of Reference Sample R-1 is 4.1%, wherein the vaporization percentage of phenol is measured by the following steps:

(a) curing 5 grams of liquid resin at 170° C. for 5 hours to form a solid;

(b) cooling the solid to room temperature and then weighing 1 gram of the solid;

(c) heating the 1 gram of solid in a tube furnace from room temperature to 1000° C. at 15° C./minute, and then being held at 1000° C. under an inert atmosphere for 10 minutes to form a vaporized composition;

(d) collecting the vaporized composition that vaporizes off from the solid in step (c);

(e) quantifying the amount of phenol that vaporized from the solid in step (c); and (f) determining the amount of the vaporized phenol as a percentage of the 1 gram of cooled solid in step (b), wherein the Reference Sample R-1 is a phenolic resin composition having a molar ratio of formaldehyde to phenol of 1.2, a pH of from about 7-10 pH and a viscosity of from 4500 cPs- 6500 cPs.

10. A refractory composition comprising the phenolic resin composition according to claim 9 and at least 50 wt. % of one or more refractory aggregate(s), based on a total weight of the refractory composition.

11. A refractory article formed into a shape comprising said refractory composition according to claim 9 and heating until the phenolic resin composition is at least 20% cured and having a green strength after curing at 170° C. for 5 hours sufficient for handling a solid without falling apart.

12. The refractory article according to claim 11, wherein the article is a brick.

* * * * *